3,325,469
WATER-INSOLUBLE PYRAZOLONE MONOAZO DYESTUFFS
Alistair Howard Berrie and Raymond Windle, Manchester, England, assignors to Imperial Chemical Industries Limited, London, England, a corporation of Great Britain
No Drawing. Filed July 27, 1964, Ser. No. 385,475
Claims priority, application Great Britain, Sept. 2, 1963, 34,609/63
2 Claims. (Cl. 260—162)

This invention relates to new water-insoluble azo dyestuffs and more particularly it relates to new water-insoluble monoazo dyestuffs which are valuable for colouring synthetic textile materials especially aromatic polyester textile materials.

According to the invention there are provided the water-insoluble monoazo dyestuffs of the formula:

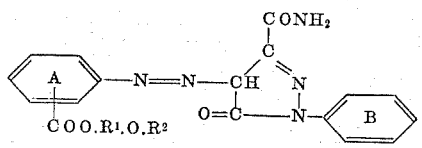

wherein $R^1$ represents an alkylene radical; $R^2$ represents a phenyl, alkyl or alkoxyalkyl radical; and the benzene rings A and B may carry further substituents other than sulphonic acid or carboxylic acid groups.

The alkylene radicals represented by $R^1$ are preferably lower alkylene radicals, that is to say alkylene radicals containing from 1 to 4 carbon atoms; and as specific examples of such radicals there may be mentioned methylene, ethylene, trimethylene, propylene and tetramethylene radicals.

The alkyl radicals represented by $R^2$ are preferably lower alkyl radicals, that is to say alkyl radicals containing from 1 to 4 carbon atoms; and as specific examples of such radicals there may be mentioned methyl, ethyl, propyl and butyl radicals.

The alkoxyalkyl radicals represented by $R^2$ are preferably lower alkoxy lower alkyl radicals, that is to say alkoxyalkyl radicals wherein the alkoxy and the alkyl groups each independently contain from 1 to 4 carbon atoms; and as specific examples of such radicals there may be mentioned ethoxymethyl, β-ethoxyethyl, β-methoxyethyl, γ-methoxypropyl and δ-ethoxybutyl radicals.

It is preferred that the —$COO.R^1OR^2$ group is attached to the benzene ring A in meta or preferably para position to the azo group which is attached to said ring.

As examples of the further substituents which may be attached to the benzene rings A and B there may be mentioned chlorine atoms, or nitro, trifluoromethyl, lower alkyl such as methyl or ethyl, lower alkoxy such as methoxy or ethoxy, lower alkyl sulphonyl such as methylsulphonyl or ethylsulphonyl, sulphonamido, and N-lower alkyl sulphonamido such as N-methylsulphonamido, N:N-dimethylsulphonamido, N-ethylsulphonamido and N:N-diethylsulphonamido groups.

According to a further feature of the invention there is provided a process for the manufacture of the water-insoluble monazo dyestuffs, as hereinbefore defined, which comprises diazotising an amine of the formula:

Formula I and coupling the resulting diazo compound with a pyrazolone of the formula:

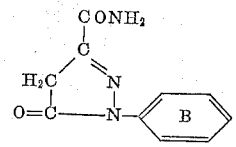

Formula II wherein $R^1$, $R^2$, A and B have the meanings stated above.

The process of the invention may be conveniently brought about by adding sodium nitrite to a solution or suspension of the amine in an aqueous solution of an inorganic acid, such as hydrochloric acid, which if desired may also contain an organic acid such as acetic acid, and thereafter adding the aqueous solution or suspension of the resulting diazo compound to an alkaline aqueous solution of the pyrazolone. The resulting mixture is then stirred, preferably at a pH between 5 and 9, to effect formation of the monoazo dyestuff, which is finally filtered off, washed and dried.

The amines of Formula I may themselves be obtained by reacting the corresponding nitrobenzoyl chloride with an alcohol of the formula: $HO.R^1.OR^2$ and subsequently reducing the nitro group to an amino group.

As specific examples of amines of Formula I which can be used in the process of the invention there may be mentioned β-ethoxyethyl 2-, 3- or 4-aminobenzoate, β-methoxyethyl 2-, 3- or 4-aminobenzoate, β-phenoxyethyl 2-, 3- or 4-aminobenzoate, β-ethoxyethyl-2-amino-5-nitrobenzoate, β-ethoxyethyl-2-amino-4-chlorobenzoate and β-(β'-ethoxyethoxy)ethyl 4-aminobenzoate.

As specific examples of pyrazolones of Formula II which can be used in the process of the invention there may be mentioned 1-phenyl-3-carbamoyl-5-pyrazolone, 1-(2'-, 3'- or 4'-chlorophenyl)-3-carbamoyl-5-pyrazolone, 1 - (2':5' - dichlorophenyl) - 3 - carbamoyl - 5 - pyrazolone, 1-(2'-, 3'- or 4'-methylphenyl)-3-carbamoyl-5-pyrazolone, 1-(2'-, 3'- or 4'-methoxyphenyl)-3-carbamoyl-5-pyrazolone, 1-(2'-, 3'- or 4'-nitrophenyl)-3-carbamoyl-5-pyrazolone, 1-(2'-, 3'- or 4'-methylsulphonylphenyl)-3-carbamoyl - 5 - pyrazolone, 1 - (3' - sulphamylphenyl) - 3 - carbamoyl - 5 - pyrazolone, 1 - (3' - (N - methylsulphamyl)phenyl) - 3 - carbamoyl - 5 - pyrazolone and 1 - [3' - (N:N - dimethylsulphamyl)phenyl] - 3 - carbamoyl - 5 - pyrazolone.

One preferred class of the monoazo dyestuffs of the invention comprises the monoazo dyestuffs which are represented by the formula:

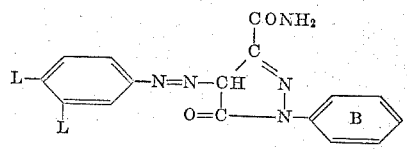

wherein one L represents a hydrogen atom and the other L represents a group of the formula: —$COO.R^1.O.R^2$, wherein $R^1$ and $R^2$ have the meanings stated, and the benzene ring B may carry substituents other than carboxylic acid and sulphonic acid groups.

A second preferred class of the monoazo dyestuffs of the invention comprises the monoazo dyestuffs wherein in the —$COOR^1.OR^2$ group $R^1$ represents an ethylene radical and $R^2$ represents a lower alkyl radical.

The monoazo dyestuffs of the invention when dispersed in aqueous medium have excellent affinity for synthetic textile materials, such as cellulose acetate, polyamide and aromatic polyester textile materials, which they colour in yellow to orange shades possessing excellent fastness to washing and to light.

The monoazo dyestuffs of the invention are particularly valuable for colouring aromatic polyester, for example polyethylene terephthalate, textile materials as they build up well on such textile materials to give heavy depths of shade.

Aromatic polyester textile materials can be dyed using aqueous dispersions of the monoazo dyestuffs of the invention at temperatures of about 100° C. in the presence of a carrier such as diphenyl, or preferably at temperatures of about 130° C. under superatmospheric pressure when it is found that dyeing can be carried out without a carrier being present.

ethyl-2-aminobenzoate whereby a similar dyestuff is obtained.

The following table gives further examples of the monoazo dyestuffs of the invention which are obtained by diazotising the amines listed in the second column of the table and coupling the diazo compounds so obtained with the 5-pyrazolones listed in the third column of the table by methods similar to that described in Example 1. The fourth column of the table lists the shades obtained when the dyestuffs are applied to a polyethylene terephthalate textile material.

| Example | Amine | 5-Pyrazolone | Shade |
|---|---|---|---|
| 3 | β-ethoxyethyl-3-aminobenzoate | 1-phenyl-3-carbamoyl-5-pyrazolone | Yellow. |
| 4 | β-methoxyethyl 4-aminobenzoate | ----do---- | Reddish-Yellow. |
| 5 | β-phenoxyethyl-4-aminobenzoate | ----do---- | Do. |
| 6 | ethoxymethyl 4-aminobenzoate | ----do---- | Do. |
| 7 | γ-(iso-propoxy)-n-propyl-4-aminobenzoate | ----do---- | Do. |
| 8 | β-(β'-ethoxyethoxy)ethyl 4-aminobenzoate | ----do---- | Do. |
| 9 | β-ethoxyethyl 4-aminobenzoate | 1-(2'-chlorophenyl)-3-carbamoyl-5-pyrazolone | Yellow. |
| 10 | ----do---- | 1-(3'-nitrophenyl)-3-carbamoyl-5-pyrazolone | Do. |
| 11 | ----do---- | 1-(2'-methylphenyl)-3-carbamoyl-5-pyrazolone | Do. |
| 12 | ----do---- | 1-(2':5'-dichlorophenyl)-3-carbamoyl-5-pyrazolone | Do. |
| 13 | ----do---- | 1-(4'-methoxyphenyl)-3-carbamoyl-5-pyrazolone | Orange. |
| 14 | ----do---- | 1-(4'-methylsulphonylphenyl)-3-carbamoyl-5-pyrazolone | Reddish-yellow. |
| 15 | β-ethoxyethyl 4-aminobenzoate | 1-(3'-sulphamylphenyl)-3-carbamoyl-5-pyrazolone | Do. |
| 16 | ----do---- | 1-(3'-(N:N-diethylsulphamyl)phenyl)-3-carbamoyl-5-pyrazolone | Do. |
| 17 | ----do---- | 1-(3'-trifluoromethylphenyl)-3-carbamoyl-5-pyrazolone | Yellow. |
| 18 | β-ethoxyethyl-2-amino-5-nitrobenzoate | 1-phenyl-3-carbamoyl-5-pyrazolone | Orange. |
| 19 | β-ethoxyethyl-2-amino-4-chlorobenzoate | ----do---- | Reddish-yellow. |
| 20 | β-ethoxyethyl-2-amino-4-trifluoromethylbenzoate | ----do---- | Do. |

Alternatively the monoazo dyestuffs of the invention can be applied to aromatic polyester textile materials by a padding or printing process, the textile material being subsequently steamed or baked. When applied by such a process the aqueous dispersion of the dyestuff preferably contains a thickener, such as sodium alginate, a migration inhibitor or other additives such as urea which are commonly present in printing pastes or padding liquors.

After applying the said dyestuffs to aromatic polyester textile materials the said textile materials are preferably given a "soaping treatment" in a hot aqueous solution of soap or a synthetic detergent. It is also advantageous to treat the said textile materials in a weak alkaline solution of sodium hydrosulphite before the soaping treatment since this helps to facilitate the removal of any loose dyestuff from the surface of the textile material.

The yellow to orange shades so produced on aromatic polyester textile materials have excellent fastness to washing, to light, and to the dry heat treatments at high temperatures which are commonly used in pleating operations.

The invention is illustrated but not limited by the following examples in which the parts are by weight.

EXAMPLE 1

20.9 parts of a β-ethoxyethyl-4-aminobenzoate are dissolved in 80 parts of water and 21 parts of concentrated hydrochloric acid. The solution is then cooled to between 0° and 5° C. and a solution of 7 parts of sodium nitrite in 40 parts of water is added at this temperature during 2 to 3 minutes. After stirring for 10 minutes the excess nitrous acid is destroyed by addition of sulphamic acid. The diazonium solution is filtered and added to a solution of 20.3 parts of 1-phenyl-3-carbamoyl-5-pyrazolone, 4 parts of sodium hydroxide and 26 parts of sodium carbonate (anhydrous) in 1000 parts of water. When the coupling is complete the mixture is acidified by the addition of acetic acid. The dyestuff is filtered off, washed with 2000 parts of cold water and dried at 60° C. The dyestuff obtained, when applied to polyethylene terephthalate textile material from an aqueous dispersion at 130° C. builds up well to produce bright yellow shades with excellent fastness to heat and to light.

EXAMPLE 2

In place of the β-ethoxyethyl-4-aminobenzoate used in Example 1 there is used an equal quantity of β-ethoxy-

What we claim is:
1. The water-insoluble monoazo dyestuffs of the formula:

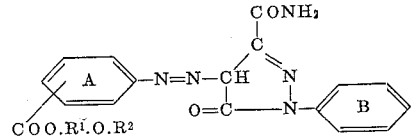

wherein $R^1$ represents a lower alkylene radical;
$R^2$ is selected from the class consisting of phenyl, lower alkyl and lower alkoxy lower alkyl;
and any further substituents on the benzene rings A and B are selected from the class consisting of chlorine, nitro, trifluoromethyl, lower alkyl, lower alkoxy, lower alkylsulphonyl, sulphonamido and N-lower alkylsulphonamido.

2. The water-insoluble monoazo dyestuffs of the formula:

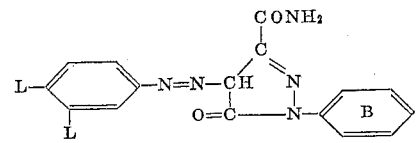

wherein one L represents a hydrogen atom and the other L represents a —$COO.R^1.O.R^2$ group; wherein $R^1$ represents a lower alkylene radical;
$R^2$ is selected from the class consisting of phenyl, lower alkyl and lower alkoxy lower alkyl;
and any substituents on the benzene ring B are selected from the class consisting of chlorine, nitro, trifluoromethyl, lower alkyl, lower alkoxy, lower alkylsulphonyl, sulphonamido and N-lower alkyl sulphonamido.

References Cited

UNITED STATES PATENTS 3,130,190  4/1964  Merian et al. _____ 260—163

CHARLES B. PARKER, *Primary Examiner.*

FLOYD D. HIGEL, *Assistant Examiner.*